US010732315B2

(12) United States Patent
Zhang et al.

(10) Patent No.: US 10,732,315 B2
(45) Date of Patent: Aug. 4, 2020

(54) REAL-TIME INVERSION OF ARRAY DIELECTRIC DOWNHOLE MEASUREMENTS WITH ADVANCED SEARCH FOR INITIAL VALUES TO ELIMINATE NON-UNIQUENESS

(71) Applicant: Baker Hughes, a GE company, LLC, Houston, TX (US)

(72) Inventors: Yinxi Zhang, Richmond, TX (US); Alberto Mezzatesta, Houston, TX (US)

(73) Assignee: Baker Hughes, A GE Company, LLC, Houston, TX (US)

( * ) Notice: Subject to any disclaimer, the term of this patent is extended or adjusted under 35 U.S.C. 154(b) by 222 days.

(21) Appl. No.: 15/858,725

(22) Filed: Dec. 29, 2017

(65) Prior Publication Data

US 2019/0204466 A1    Jul. 4, 2019

(51) Int. Cl.
*G01V 3/30* (2006.01)
*G01V 3/34* (2006.01)
*E21B 47/10* (2012.01)

(52) U.S. Cl.
CPC .............. *G01V 3/30* (2013.01); *E21B 47/102* (2013.01); *G01V 3/34* (2013.01)

(58) Field of Classification Search
CPC ........... G01V 3/30; G01V 3/34; E21B 47/102
See application file for complete search history.

(56) References Cited

U.S. PATENT DOCUMENTS

| 3,849,721 | A | 11/1974 | Calvert |
| 5,144,245 | A | 9/1992 | Wisler |
| 5,469,062 | A | 11/1995 | Meyer, Jr. |
| 9,429,012 | B2 | 8/2016 | Ahmad et al. |
| 2007/0061082 | A1* | 3/2007 | Seleznev ................. G01V 3/26 702/11 |
| 2008/0290874 | A1 | 11/2008 | Seleznev et al. |

(Continued)

OTHER PUBLICATIONS

International Application No. PCT/US2018/067728—Search Report dated Apr. 24, 2019.

(Continued)

*Primary Examiner* — Christopher P McAndrew
*Assistant Examiner* — Zannatul Ferdous
(74) *Attorney, Agent, or Firm* — Mossman, Kumar & Tyler PC

(57) ABSTRACT

Methods and apparatus for evaluating a volume of an earth formation carried out using complex dielectric measurements. Methods include making measurements of complex permittivity at a plurality of frequencies; identifying an optimal frequency by: identifying candidate frequencies having a corresponding measurement with a respective sensitivity to at least one of i) salinity and ii) water-filled porosity, by determining that each respective sensitivity is substantially independent of rock texture; selecting a maximum of the candidate frequencies as the optimal frequency; using a table search method based on a forward model to generate an initial estimate of at least two parameters of the volume; and using the initial estimate as an initial condition for an inversion of other measurements at frequencies other than the optimal frequency to generate a final solution comprising final estimates for formation properties. The at least two parameters may comprise water salinity and water filled porosity.

12 Claims, 12 Drawing Sheets

(56) References Cited

U.S. PATENT DOCUMENTS

| | | |
|---|---|---|
| 2010/0078165 A1 | 4/2010 | Seleznev et al. |
| 2012/0153958 A1* | 6/2012 | Anderson ................ G01V 3/30 324/332 |
| 2013/0027043 A1* | 1/2013 | Li ........................... G01V 3/30 324/341 |
| 2013/0270431 A1* | 10/2013 | Minette ................... G01V 5/12 250/269.3 |
| 2015/0073712 A1 | 3/2015 | Kherroubi et al. |
| 2015/0127264 A1* | 5/2015 | Hadj-Sassi ............... G01V 3/30 702/7 |
| 2016/0097876 A1 | 4/2016 | Freed et al. |
| 2017/0102479 A1 | 4/2017 | Kouchmeshky et al. |

OTHER PUBLICATIONS

Revil, A., "Effective Conductivity and Permittivity of Unsaturated Porous Materials in the Frequency Range 1mHz-1Ghz," Water Resour Res. Jan. 2013; 49(1): 306-327.

* cited by examiner

REAL-TIME INVERSION OF ARRAY DIELECTRIC DOWNHOLE MEASUREMENTS WITH ADVANCED SEARCH FOR INITIAL VALUES TO ELIMINATE NON-UNIQUENESS

FIELD OF THE DISCLOSURE

This disclosure generally relates to exploration and production of hydrocarbons involving investigations of regions of an earth formation penetrated by a borehole. More specifically, the disclosure relates to interpretation of dielectric measurements of an earth formation using a logging tool in a borehole.

BACKGROUND OF THE DISCLOSURE

Electrical earth borehole logging is well known and various devices and various techniques have been described for this purpose. Broadly speaking, there are two categories of electrical logging apparatus. In the first category, one or more measurement electrodes—current source(s) or sink(s)—are used in conjunction with a return electrode (which may be a diffuse electrode such as a logging tool's body or mandrel). A measurement current flows in a circuit that connects a current source to the measurement electrode(s), through the earth formation to the return electrode, and back to the current source in the tool. In a second category, that of inductive measuring tools, an antenna within the measuring instrument induces a current flow within the earth formation. The magnitude of the induced current is detected using either the same antenna or a separate receiver antenna. The measured responses are affected by properties of the earth formation including electrical conductivity, magnetic permeability, dielectric permittivity and the pore volume or porosity of the rock matrix and water saturation.

The dielectric constant of the formation may be estimated by transmitting an electromagnetic (EM) wave into the formation, and receiving it at one or more receivers (e.g., at receiver antennas). Then, the attenuation and phase shift between the received signals and the transmitted signals are determined, which are used to estimate the dielectric constant of the formation. Alternatively, the attenuation and phase shift between spaced receivers may be used to estimate the dielectric constant of the formation.

Multi-frequency dielectric tools can detect formation texture and water content. By combining complex permittivity measurements with measurements from other borehole devices (e.g., total formation porosity), the water salinity of the formation and water filled porosity of the formation can be estimated.

SUMMARY OF THE DISCLOSURE

In aspects, the present disclosure is related to a method for evaluating a volume of an earth formation wherein the volume comprises a rock matrix saturated by a fluid including water. The evaluation is carried out using complex dielectric measurements. The complex dielectric measurements are modeled using a mixing model approximating the dielectric behavior of the formation.

Methods include making measurements of complex permittivity at a plurality of frequencies using an electromagnetic tool comprising a transmitter and a receiver in a borehole penetrating the earth formation; identifying an optimal frequency by: identifying candidate frequencies of the plurality of frequencies having a corresponding measurement with a respective sensitivity to at least one of i) salinity and ii) water-filled porosity, by determining that each respective sensitivity is substantially independent of rock texture; selecting a maximum of the candidate frequencies as the optimal frequency; using a table search method based on a forward model to generate an initial estimate of at least two parameters of the volume; and using the initial estimate for the at least two parameters as an initial condition for an inversion of other measurements of the plurality of measurements at a frequency other than the optimal frequency to generate a final solution comprising final estimates for properties of the formation.

The at least two parameters may comprise water salinity and water filled porosity. Methods may include identifying candidate frequencies based on an uncertainty value associated with at least one of: i) a set of respective values for conductivity and permittivity of each candidate frequency, and ii) amplitude values of receiver sensor signal of the electromagnetic tool. The table search method may comprise a correlation of the initial estimate of the at least two parameters with a combination of a particular conductivity value and a particular permittivity value at the optimal frequency at a particular spacing for the transmitter and the receiver. Methods include using the initial estimate of the at least two parameters to generate a model for performing an inversion which uses the plurality of propagation measurements as input and generates at least one petrophysical parameter as output. The model may include a petrophysical mixing model.

Methods may include adjusting a weight on an inversion model based on an uncertainty for the initial estimate of the at least two parameters and uncertainty for the plurality of propagation measurements. Methods may include performing additional inversion iterations using a minimization routine to converge to the final solution for the plurality of frequencies. Methods may include using the final solution to estimate an effective permittivity and an effective conductivity of the volume. Methods may include conveying the electromagnetic tool in the borehole. The electromagnetic tool may employ electrical induction.

Apparatus embodiments may include a carrier configured to be conveyed in a borehole penetrating the earth formation; an electromagnetic tool disposed on the carrier and configured to make measurements of complex permittivity of a volume of the earth formation proximate the tool at a plurality of frequencies; and at least one processor operatively connected to the tool. The at least one processor may be configured to identify an optimal frequency by: identifying candidate frequencies of the plurality of frequencies having a corresponding measurement with a respective sensitivity to at least one of i) salinity and ii) water-filled porosity, by determining that each respective sensitivity is substantially independent of rock texture. The at least one processor may be configured to selecting a maximum of the candidate frequencies as the optimal frequency; use a table search method based on a forward model to generate an initial estimate of at least two parameters of the volume; and use the initial estimate for the at least two parameters as an initial condition for an inversion of other measurements of the plurality of measurements at a frequency other than the optimal frequency to generate a final solution comprising final estimates for properties of the formation.

Method embodiments may include using the at least one processor to perform at least one of: i) storing the at least one property in a computer memory; ii) transmitting the at least one property uphole; or iii) displaying of the at least one property to an operating engineer. Methods may include conveying the electromagnetic tool in the borehole. The electromagnetic tool may use electrical induction.

Some embodiments include a non-transitory computer-readable medium product accessible to the processor and having instructions thereon that, when executed, causes the at least one processor to perform methods described above. Apparatus embodiments may include at least one processor and a computer memory accessible to the at least one processor comprising a computer-readable medium having instructions thereon that, when executed, causes the at least one processor to perform methods described above.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1:
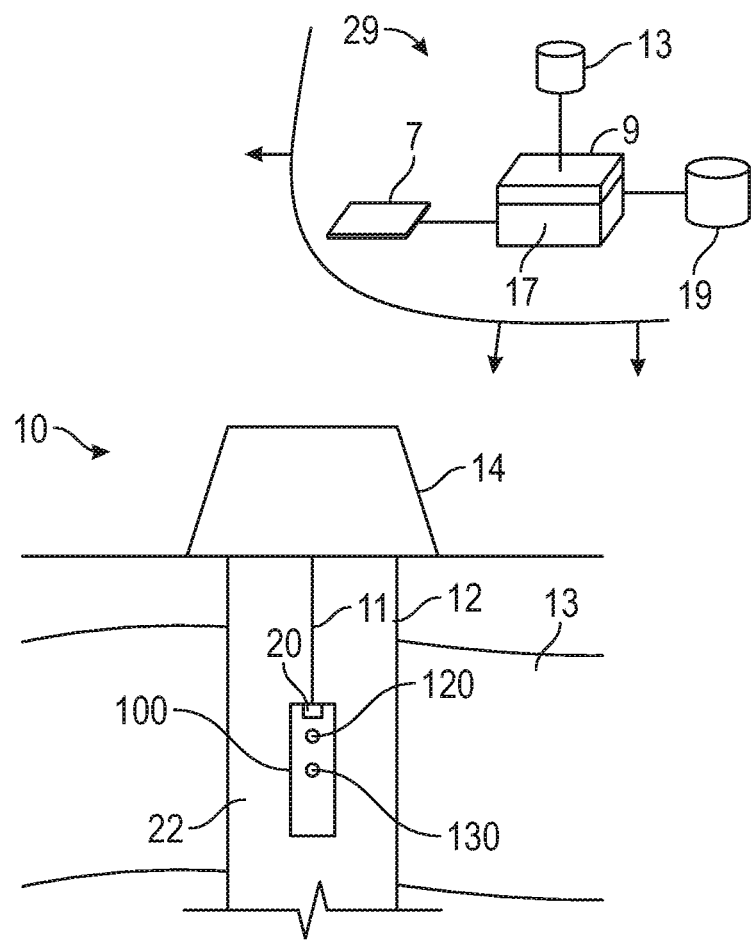
FIG. 1 shows an exemplary embodiment of a system for evaluation of an earth formation using measurements from a downhole electromagnetic tool.

This disclosure generally relates to exploration for hydrocarbons involving electromagnetic investigations of a volume of an earth formation adjacent to a borehole penetrating the formation. The volume may include all or portions of the formation. These investigations may include estimating at least one parameter of interest of the volume, such as a permittivity parameter, a water salinity of the formation, and/or a water filled porosity of the volume.

Multi-frequency dielectric tools are able to resolve texture and water content of the pore structure of a formation or volume of a formation. Formation water salinity is crucial to downhole dielectric measurements. In general, salinity will decrease water permittivity but increase its conductivity. Meanwhile, at various frequencies, influences of salinity on complex permittivity measurements may take different manifestations.

Permittivity and resistivity at a sufficiently high frequency (e.g., 1 GHz) are predominantly driven by water salinity and water-filled porosity. On the other hand, textural and interfacial effects dominate at lower frequencies, resulting in non-unique inversion solutions from downhole responses. Techniques of the present disclosure take into account variations in dielectric sensitivity with respect to various formation properties.

Aspects of the present disclosure include an initial guess search method based on the highest frequency permittivity and conductivity. Inversion under this technique may be configured to start from the most reliable salinity solution and be constrained by the solution as a reference model. Therefore, the final inversion result not only honors the measurement data, but also eliminates ambiguity and improves stability.

The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein. Indeed, as will become apparent, the teachings of the present disclosure can be utilized for a variety of well tools and in all phases of well construction and production. Accordingly, the embodiments discussed below are merely illustrative of the applications of the present disclosure.

Dielectric permittivity arises in sedimentary rock from the ability of electric dipoles to align themselves with an alternating electromagnetic field, such as one induced by a downhole tool. Several phenomena contribute to $\varepsilon_r$ in a porous earth formation. One contribution is the rotation of dipolar molecules (e.g., water). In the presence of an applied electric field, a dipolar molecule will rotate to align the positive and negative poles of the molecule with the applied electric field. In such an alternating field, the molecule will rotate constantly with the variation in polarity of the applied field. While the molecule is in rotation to align with the applied field, the movement of the charge represents electrical charges moving in phase with the applied field and are therefore carrying current and contributing to the composite formation conductivity. Once aligned with the field, the polarized molecules represent fixed or stored charges and thereby contribute to the formation permittivity until the polarity of the alternating applied field is reversed. At this time, the molecules again rotate contributing again to composite formation conductivity. The motions of ions also contribute, compounding these effects.

Measured values of $\varepsilon_r$ are dependent upon the frequency of the applied field. Dispersion of dielectric constant may be due to electrical polarization generally falling in one of three categories: interfacial polarization, which is typically dominant at KHz to MHz frequencies; molecular orientation, which is mainly related to dipole moment of molecules and is more pronounced at frequencies in the range of MHz to GHz; and electronic polarization, which is due to the resonance of each atom in the media and thus negligible at frequencies lower than 1 GHz.

At low frequencies, dielectric constants can be quite high since the water molecules can easily rotate and align themselves with the field before the polarity of the field reverses. Similarly, dissolved ions can migrate to the boundary of the pore space and accumulate against the pore wall long before the polarity of the field reverses. Therefore, at low frequencies, molecules spend most of the AC cycle in a fixed orientation or position and only a small fraction of the time moving.

At high frequencies, the polarity of the applied field will reverse before mobile charges come to rest. In this situation, the mobile charges spend most of their time moving in phase with the external electromagnetic field, thereby increasing the conductivity and resulting in a lower measured dielectric constant. The phenomenon of changing dielectric and conductivity values with frequency is known as dispersion. The frequency at which the rotating molecules or mobile ions can no longer keep pace with the oscillating field is known as the "relaxation frequency."

Geophysical media within an earth formation may be mixtures of materials, with each material exhibiting different dielectric characteristics. In remote-sensing applications, it may be desirable to approximate the microscopically complicated mixture as macroscopically homogeneous volume and characterize it by an effective permittivity. One constituent in these mixtures is typically water. The dielectric properties of the volume are sensitive to small variations in the fractional component volumes, because the permittivity of water is usually very different than that of the other components (e.g., hydrocarbons and dry rock). For example, fresh water at room temperature has a dielectric constant value around 75, and dry sands about 5.

Dielectric logging uses the contrast between dielectric constant of water, rock and oil (or other hydrocarbons) to estimate the formation water content, along with other properties. The permittivity of the formation can be considered as a complex quantity which contains dielectric constant and conductivity in its real and imaginary component $$\widetilde{\varepsilon}_r(\omega) = \varepsilon_r(\omega) + i\frac{\sigma(\omega)}{\omega \varepsilon_0} \quad (1)$$

where $\widetilde{\varepsilon}_r$ is the complex value representing relative permittivity, $\varepsilon_r$ is relative dielectric constant, $\sigma$ is electrical conductivity, $\omega$ is angular frequency and $\varepsilon_0$ is dielectric constant of vacuum. In current dielectric logging tools, the magnitude and phase of an electromagnetic wave propagating in the formation is measured at multiple receivers. The relative magnitude and phase of a detected signal at the respective receivers is used to obtain $\varepsilon_r$ and $\sigma$, which are functions of frequency due to the dispersive behavior of the formation. In practice, the measurement is performed at multiple frequencies in order to obtain a good estimate of the dispersive behavior.

The dispersive behavior of the formation is a result of the properties of its constituents (water, rock matrix and hydrocarbon) as well as the volume fraction of each of these phases, their geometry and distribution within a representative volume of the formation. However, the mixture of these three phases exhibits a dispersive behavior different from the weighted average of dispersive behavior of each. There exist several mixing laws (or mixing models) that relate the dielectric behavior of a mixture to the properties of its constituents.

Measuring the dielectric dispersive behavior of the formation and fitting it to mixing laws that are shown to be representative of the behavior of the formation under study provides information on the volume fraction of each component and formation texture information. This information is invaluable for estimating the hydrocarbon content in the reservoir under study.

Mixing laws are used to estimate an effective permittivity of a composite of inclusions in a host matrix. In the oil and gas industry, petrophysicists usually exploit mixing laws to the mixture of formation matrix and fluids in the pores. Several dielectric models have been set forth which attempt to approximate the permittivity of mixtures in terms of the known dielectric constants and volume fractions of the constituents. Some example mixing models include the Complex Refractive Index Model (CRIM) and Looyenga-Landau-Lifshitz model, along with other exponential models, and variants of the Maxwell-Garnett model, including the Coherent Potential model, and the Symmetric Bruggeman Model.

CRIM may be the most commonly used of these. CRIM is an empirical formula describing complex permittivity of the entire media as a superimposition from the product of volumetric factor and permittivity of each component. CRIM has been validated in a laboratory setting and coincides with other effective medium approaches in sandstone analysis. U.S. Pat. No. 5,144,245 to M. M. Wisler discloses the use of the Complex Refractive Index Model (CRIM) as a means for correcting resistivity measurements for dielectric effects where the resistivity amplitude and phase data are taken at a single frequency. Although applicability of CRIM for all formation types is not certain, it is widely used in clean sand formation evaluation due to its simplicity.

Velocity of the electromagnetic wave is proportional to inverse square root of permittivity. A plane wave solution will have the form $$V = Ce^{ikx} \quad (2)$$

where
V=a field variable;
C=a constant
e=the naperian log base
i=the square root of 1;
x=the distance traveled; and $$k = [(\omega^2 \mu_o \mu_r \varepsilon_o \varepsilon_r) - (i\omega \mu_o \mu_r \sigma)]^{1/2}$$

where:
c=the speed of light=2.999 $10^8$ (meters/second);
$\mu_o$=the magnetic permeability of free space=$4\pi \times 10^{-7}$ [N/A$^2$];
$\mu_r$=the relative permeability (which is 1.0 for free space and most earth materials);
$\varepsilon_o$=the electric permittivity of free space=$1/(\mu_o C^2)$=$8.854 \times 10^{-12}$ [F/m];
$\varepsilon_r$=the relative dielectric constant (which is 1.0 in free space);
$\omega$=the angular frequency of the applied field; and
$\sigma$=the conductivity.

The term k can be rewritten in terms of a relative complex dielectric constant, $$\tilde{\epsilon}_r = \varepsilon_r - i\sigma(1/\omega \varepsilon_o). \quad (3)$$

The CRIM model is a simple model that obtains the effective permittivity of a mixture based on the weighted average of its constituents. It simplifies the mixture as a layered composite with each layer having properties that correspond to a phase in the mixture and a thickness that is proportional to the volume fraction of each phase. The speed of electromagnetic wave in a material is related to the speed in vacuum through $$\frac{c}{c_0} = (\Gamma_r \tilde{\epsilon}_r)^{-0.5},$$

where c is the speed of electromagnetic wave in material, $c_0$ the speed of electromagnetic wave in vacuum, $\Gamma_r$ is the relative permeability and $\tilde{\epsilon}_r$ is the complex relative permittivity. The total travel time for the electromagnetic wave is seen as the sum of the time it takes for the wave to travel in each layer (phase). Using this hypothesis and assuming the relative permeability to be the same for all phases result in $$\tilde{\epsilon}_{eff}^{0.5} = \sum_{i=1}^{N} f_i \tilde{\epsilon}_i^{0.5} \quad (4)$$

where $\tilde{\epsilon}_i$ is dielectric property for each phase present in the mixture and $f_i$ is volume fraction of each phase. In case of a mixture of solid matrix (m), water (w) and oil (o) the equation becomes $$\tilde{\epsilon}_{eff}^{0.5} = (1-\varphi)\tilde{\epsilon}_m^{0.5} + \varphi S_W \tilde{\epsilon}_w^{0.5} + \varphi(1-S_W)\tilde{\epsilon}_o^{0.5}. \quad (5)$$

Under direct current, only the water portion is substantially conductive, and rewriting Eq. (5) equation for its real part at frequency of zero and assuming $\sigma_m = \sigma_o = 0$ leads to $$\sigma_{eff}^{0.5} = \varphi S_W \sigma_w^{0.5}. \quad (6)$$

Water permittivity is dispersive with respect to frequency, and the dispersive behavior can be well defined by Debye's Model, $$\varepsilon^*_{Water}(\omega) = \varepsilon_\infty + \frac{\varepsilon_s - \varepsilon_\infty}{1 + i\omega\tau} + j\frac{1}{\omega\varepsilon_0 R z}. \quad (7)$$

Approaching a frequency of 1 GHz, impact from the imaginary term in the above equation diminishes since frequency in the dominator is too high. Hence the model becomes salinity independent. The Klein-Swift model explicitly described how $\sigma_w$, $\varepsilon_s$, $\varepsilon_\infty$, and $\tau$ are influenced by temperature and water salinity, but fails to account for the fact that shale content and CEC will also have a critical impact on $\sigma_w$, as described in further detail below.

FIG. 1 shows an exemplary embodiment of a system for evaluation of an earth formation using measurements from a downhole electromagnetic tool. The system 10 includes a carrier 11 that is shown disposed in a wellbore or borehole 12 that penetrates at least one earth formation 13 during a drilling operation and makes measurements of properties of the formation 13 and/or the borehole 12 downhole. As described herein, "borehole" or "wellbore" refers to a single hole that makes up all or part of a drilled well. Depending on the configuration, the system 10 may be used during drilling and/or after the wellbore 12 has been formed. While a land system is shown, the teachings of the present disclosure may also be utilized in offshore or subsea applications.

As described herein, "formations" refer to the various features and materials that may be encountered in a subsurface environment surrounding the borehole. A formation may include a fluid-saturated rock matrix. The term "information" includes, but is not limited to, raw data, processed data, and signals.

It should be understood that embodiments of the present disclosure are equally well suited for use in wells having various configurations including horizontal wells, deviated wells, slanted wells, multilateral wells and so on. Accordingly, use of directional terms herein (e.g., above, below, upper, lower, upward, downward, topmost, lowermost, uphole, downhole, etc) refer to the direction of travel along the borehole either toward or away from the surface, with the upward direction being toward the surface and the downward direction being away from the surface.

In some embodiments, the system 10 includes a downhole wireline tool 100 suspended in a borehole 12 penetrating an earth formation 13 from a suitable carrier 11, such as a cable that passes over a sheave mounted on a derrick 14. The cable may include a stress member and a number of conductors (typically seven) for transmitting commands to the tool 100 from the surface, receiving data at the surface from the tool, and supplying power to the tool. The tool 100 may be raised and lowered by a draw works.

Downhole tool 100 may be coupled or combined with additional tools including some or all the hardware environment 29, described in further detail below. The hardware environment 29 may implement one or more control units configured to operate the tool 100 or other components of system 10, and/or conduct method embodiments disclosed below.

The hardware environment 29 may include at least one processor, implemented, for example, as a suitable computer. The hardware environment 29 may be located downhole, at the surface, and/or remotely and provide for performing data analysis in the field (including in real time), or alternatively, the recorded data may be sent to a remote processing center for post processing of the data. Also, the data may be partially processed in real time and partially at a processing center.

A surface control system 15 may receive signals from downhole sensors and other sensors used in the system 10 and processes such signals according to programmed instructions provided to the surface control system 15. The surface control system 15 may display desired parameters and other information on a display/monitor that is utilized by an operator. The surface control system 15 may further communicate with a downhole control system 20 at a suitable location on downhole tool 10. The surface control system 15 may process data relating to the operations and data from the sensors, and may control one or more downhole operations performed by system 100.

In one embodiment, electronics associated with sensors 120 and/or 130 may be configured to record and/or process the information obtained. Certain embodiments of the present disclosure may be implemented with a hardware environment 29 that includes an information processor 17, an information storage medium 13, an input device 7, processor memory 9, and may include peripheral information storage medium 19. The hardware environment may be in the well, at the rig, or at a remote location. Moreover, the several components of the hardware environment may be distributed among those locations. The input device 7 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 17 to execute the disclosed method. Information storage medium 13 may also store the formation information provided by the user, or the formation information may be stored in a peripheral information storage medium 19, which may be any standard computer information storage device, such as a USB drive, memory stick, hard disk, removable RAM, or other commonly used memory storage system known to one of ordinary skill in the art including Internet based storage. Information processor 17 may be any form of computer or mathematical processing hardware, including Internet based hardware. When the program is loaded from information storage medium 13 into processor memory 9 (e.g. computer RAM), the program, when executed, causes information processor 17 to retrieve detector information from either information storage medium 13 or peripheral information storage medium 19 and process the information to estimate a parameter of interest. Information processor 17 may be located on the surface or downhole.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

In one embodiment, circuitry associated with the sensors may be configured to take measurements at a plurality of borehole depths as the tool moves along the longitudinal axis of the borehole. These measurements may be substantially continuous, which may be defined as being repeated at very small increments of depth, such that the resulting information has sufficient scope and resolution to provide an image of borehole parameters.

In other embodiments, the system 10 includes a conventional derrick 14 that may support a rotary table that is rotated at a desired rotational speed. The carrier 11 may include one or more drill pipe sections that extend downward into the borehole 12 from the rotary table, and is connected to a drilling assembly. Drilling fluid or drilling mud 22 is pumped through the drillstring 11 and/or the borehole 12. The well drilling system 10 may also include a bottomhole assembly (BHA). In one embodiment, a drill motor or mud motor is coupled to the drilling assembly and rotates the drilling assembly when the drilling fluid 22 is passed through the mud motor under pressure.

The system 10 includes any number of downhole tools 100 for various processes including formation drilling, geosteering, and formation evaluation (FE) for measuring versus depth and/or time one or more physical quantities in or around a borehole. The tool 100 may be included in or embodied as a BHA, drillstring component or other suitable carrier. "Carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tubing type, of the jointed pipe type and any combination or portion thereof. Other carriers include, but are not limited to, casing pipes, wirelines, wireline sondes, slickline sondes, drop shots, downhole subs, bottom-hole assemblies, and drill strings.

In one embodiment, one or more downhole components, such as the downhole tool 100, may include sensor devices 120 configured to make electrical measurements indicative of dielectric permittivity, as described in greater detail below. Other sensors 130 may be configured to measure various parameters of the formation and/or borehole, tool position and orientation, environmental conditions such as temperature and pressure, and so on. For example, one or more sensors 130 (or sensor assemblies such as MWD subs) are configured for formation evaluation measurements and/or other parameters of interest (referred to herein as "evaluation parameters") relating to the formation, borehole, geophysical characteristics, borehole fluids and boundary conditions. These sensors 130 may include sensors for measuring borehole parameters (e.g., borehole size, borehole inclination and azimuth, and borehole roughness), sensors for measuring geophysical parameters (e.g., acoustic velocity, acoustic travel time, electrical resistivity), sensors for measuring borehole fluid parameters (e.g., viscosity, density, clarity, rheology, pH level, and gas, oil and water contents), boundary condition sensors, and sensors for measuring physical and chemical properties of the borehole fluid.

A point of novelty of the system illustrated in FIG. 1 is that the control unit(s) may be configured to perform certain methods (discussed below) that are not in the prior art. A surface control unit and/or downhole control unit may be configured to control sensors described above and to estimate a parameter of interest according to methods described herein. Control of these components may be carried out using one or more models or algorithms using methods described below.

Mathematical models, look-up tables, or other models representing relationships between the signals and the values of the formation properties may be used to characterize operations in the formation or the formation itself, optimize one or more operational parameters of production or development, and so on. The system may carry out these actions through notifications, advice, and/or intelligent control.

Various types of electrical sensors 120 may be used in evaluating the formation in accordance with embodiments disclosed herein. As one example, sensors that are based on electromagnetic (EM) wave propagation are used for many applications where amplitude and phase of wave traveled in an unknown medium are studied to infer the properties of that medium. Although aspects of the disclosure may beneficially utilize (EM) wave propagation, particular embodiments may employ the techniques disclosed herein in connection with various types of induction logging, including multi-component induction logging. In some embodiments, the electromagnetic tool 10 may include at least one transmitting antenna and at least one receiving loop antenna mounted on a pad. Dielectric measurements may be obtained, for example, by measuring amplitude attenuation and phase difference from a compensated symmetric antenna system.

As described above, dielectric measurement and evaluation may include the estimation of electric permittivity of materials. Electric permittivity may include imaginary and real parts, which may vary with the frequency of an electrical signal exposed to a material. In some aspects, electric permittivity may be estimated using an electromagnetic tool configured to generate an electric current at a plurality of frequencies.

Figure 2A:
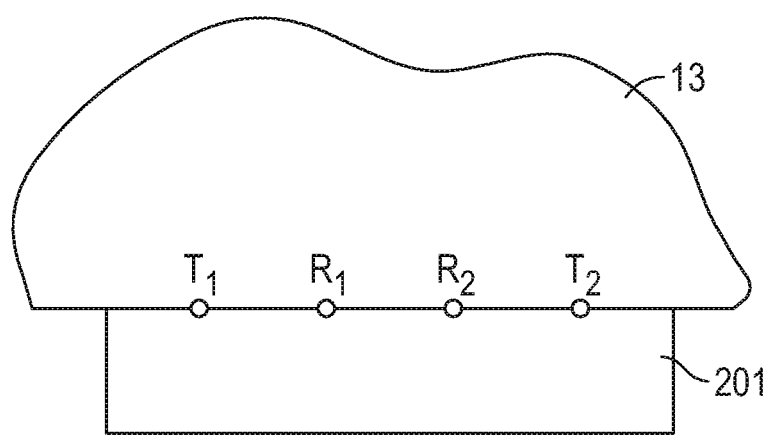
FIG. 2A depicts a cross-sectional view of downhole tool.

FIG. 2A depicts a cross-sectional view of downhole tool 201 (e.g., electromagnetic tool, dielectric tool, or other logging tool, etc.) in a homogenous medium. The tool 201 may include transmitters T1, T2 and receivers R1, R2. The transmitters T1, T2 may be symmetrically arranged with the receivers R1, R2. That is, the distance from T1 to R1 may be equal to the distance from T2 to R2; and the distance from T1 to R2 may be equal to the distance from T2 to R1.

A conventional technique of measurement compensation involving two receivers positioned symmetrically with respect to two transmitters (as shown in FIG. 2A) is demonstrated. The relative phase shift between R1 and R2 when T1 is fired may be given by:

$$\theta_{R_1R_2}^{T1} = \theta_{R_2}^{T1} - \theta_{R_1}^{T1} \quad (15)$$

The relative phase shift between R1 and R2 when T2 is fired may be given by:

$$\theta_{R_1R_2}^{T2} = \theta_{R_1}^{T2} - \theta_{R_2}^{T2} \quad (16)$$

The compensated relative phase may be given by:

$$\theta_{R_1R_2} = 0.5(\theta_{R_1R_2}^{T1} + \theta_{R_1R_2}^{T2}) \quad (17)$$

where $\theta_{R_j}^{T_i}$ is the phase measured by receiver j when transmitter i is fired and can be written as $$\theta_{R_j}^{T_i} = \theta_{T_i} + \theta_{R_j} + \theta(r) \quad (18)$$

in which $\theta_{T_i}$ and $\theta_{R_j}$ are the phase shifts of transmitter i and receiver j with respect to a common source and $\theta(r)$ is the phase shift due to wave traveling in the probed medium between transmitter and receiver which are apart by a distance of r.

Equations (15) and (16) eliminate the effect of internal phase shift at T1 and T2. As it can be seen from plugging in Equation (18) in Equations (15) and (16) and using Equation (17) one can eliminate the effect of phase shift at R1 and R2. The assumption behind this method is that the wave traveling from either of the transmitters would experience the same phase shift in the probed medium which means that the medium in front of the transmitter and receiver should be homogenous or symmetrically positioned (with respect to transmitters and receivers) heterogeneous.

Figure 2B:
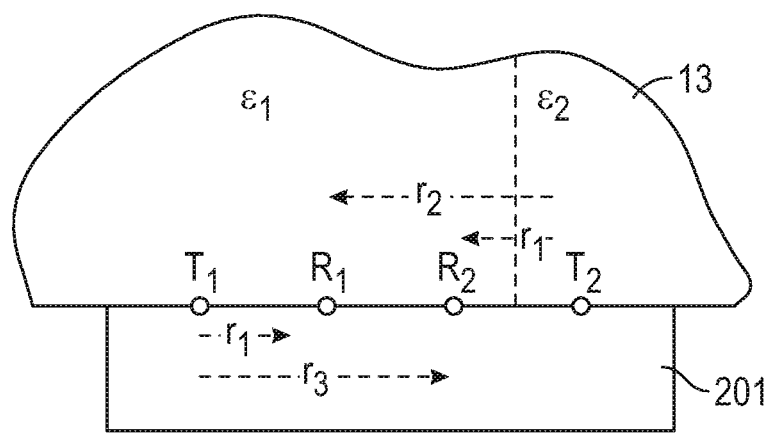
FIG. 2B depicts a cross-sectional view of tool in heterogenous media.

FIG. 2B depicts a cross-sectional view of tool 201 in heterogeneous media having relative permittivities, $\varepsilon_1$ and $\varepsilon_2$. Generally, for an electromagnetic wave propagating in a near field regime, the phase difference between the wave passing through points in space is not only a function of the distance between the two points $(r_2-r_1)$ but also a function of absolute position of those points ($r_1$ and $r_2$). Consider the medium of FIG. 2B, where the tool is positioned in a way that the interface between medium 1 and medium 2 is located between Transmitter 2 and the closest receiver (Receiver 2). Ignoring the effect of reflection at the interface, the effect of medium 2 can be replaced by an equivalent medium with the same properties as of medium 1, but with longer distance between Transmitter 2 and receivers (since $\varepsilon_2 > \varepsilon_1$).

Figure 2C:
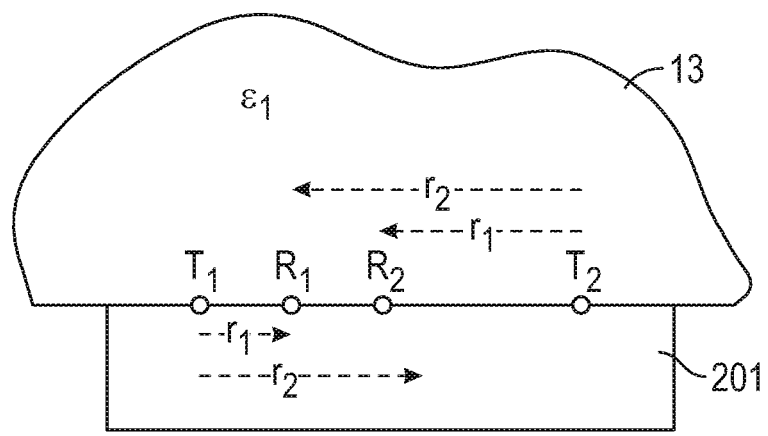
FIG. 2C shows the approximate effect of heterogeneous media on the propagation of an electromagnetic wave.

FIG. 2C shows the approximate effect of heterogeneous media on the propagation of an electromagnetic wave. Referring to FIGS. 2B-2C, although $r_2-r_1 = r^*_2-r^*_1$, $r_2 \neq r^*_2$ and $r_1 \neq r^*_1$; thus, the "simulated" distances between transmitter and receivers from the left and right are not equal. This leads to an unequal phase shift for an electromagnetic wave travelling from these transmitters, which renders the traditional approach invalid.

Figure 2D:
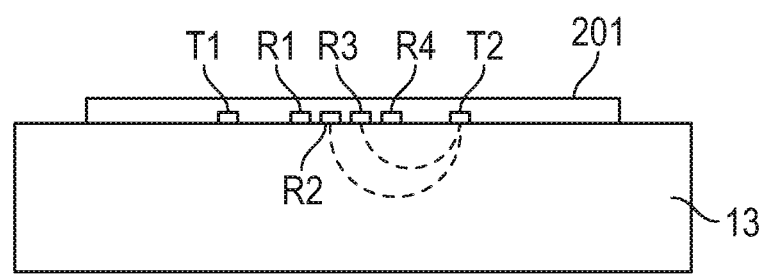
FIG. 2D shows the phase shifts of wave propagation tool 207 according to embodiments of the present disclosure.

FIG. 2D shows the phase shifts of wave propagation tool 207 according to embodiments of the present disclosure. Tool 207 may include transmitters T1, T2 and receivers R1-R4. The transmitters T1, T2 may be symmetrically arranged with the receivers R1-R4. For example, the distance from T1 to R1 may be equal to the distance from T2 to R4; and the distance from T1 to R2 may be equal to the distance from T2 to R3.

Referring to FIG. 2D, to obtain the phase difference between receivers R2 and R3, the symmetrical transmitters are used to cancel the effect of phase shift on each receiver. Upon firing transmitter T1, the phase shifts at R2 and R3 may be expressed as:

$$\theta_{R_3}^{T1} = \theta_{T_1R_3} - \theta_{R_3}^{sh} \quad (19)$$

$$\theta_{R_2}^{T1} = \theta_{T_1R_2} - \theta_{R_2}^{sh} \quad (20)$$

where $\theta_{R_j}^{T_i}$ is the phase shift recorded at receiver j when transmitter i is fired, $\theta_{T_iR_j}$ is representative of the time the EM wave propagates in the formation, $\theta_{R_j}^{sh}$ is the internal value of the phase shift at receiver j. The relative phase shift between receivers R2 and R3 after firing transmitter T1 (i.e., $\theta_{R_2}^{T1} - \theta_{R_3}^{T1}$) may be expressed as:

$$\theta_{R_2R_3}^{T1} = \theta_{T_1R_2} + \theta_{R_2}^{sh} - \theta_{T_1R_3} - \theta_{R_3}^{sh} \quad (21)$$

Upon firing transmitter T2, the phase shifts at R2 and R3 may be expressed as:

$$\theta_{R_3}^{T2} = \theta_{T_2R_3} - \theta_{R_3}^{sh} \quad (22)$$

$$\theta_{R_2}^{T2} = \theta_{T_2R_2} - \theta_{R_2}^{sh} \quad (23)$$

The relative phase shift between receivers R3 and R2 after firing transmitter T2 may be expressed as ($\theta_{R_3}^{T2} - \theta_{R_2}^{T2}$).

$$\theta_{R_3R_2}^{T2} = \theta_{T_2R_3} + \theta_{R_3}^{sh} - \theta_{T_2R_2} - \theta_{R_2}^{sh} \quad (24)$$

Conventionally, it may be assumed that these phase shifts are equal:

$$\theta_{T_2R_2} = \theta_{T_1R_3}, \theta_{T_2R_3} = \theta T_{1R_2} \quad (25)$$

After substituting $\theta_{T_1R_2}$ and $\theta_{T_1R_3}$ into Eq. (24), the relative phase shift between receivers R3 and R2 after firing transmitter T2 (i.e., $\theta_{R_3}^{T2} - \theta_{R_2}^{T2}$) may be given by:

$$\theta_{R_3R_2}^{T2} = \theta_{T_1R_2} + \theta_{R_3}^{sh} - \theta_{T_1R_3} - \theta_{R_2}^{sh} \quad (26)$$

Thus, a compensated measurement for the relative phase between receivers R3 and R2 may be given as:

$$\theta_{R_2R_3}^{com} = \frac{(\theta_{R_2R_3}^{T1} + \theta_{R_3R_2}^{T2})}{2} \quad (27)$$

$$\theta_{R_2R_3}^{com} = \theta_{T_1R_2} - \theta_{T_1R_3} \quad (28)$$

Techniques in accordance with embodiment of the present disclosure as described herein may be employed in connection with a variety of downhole tools conveyed on various carriers. Several general examples are described hereinbelow.

Figure 3A:
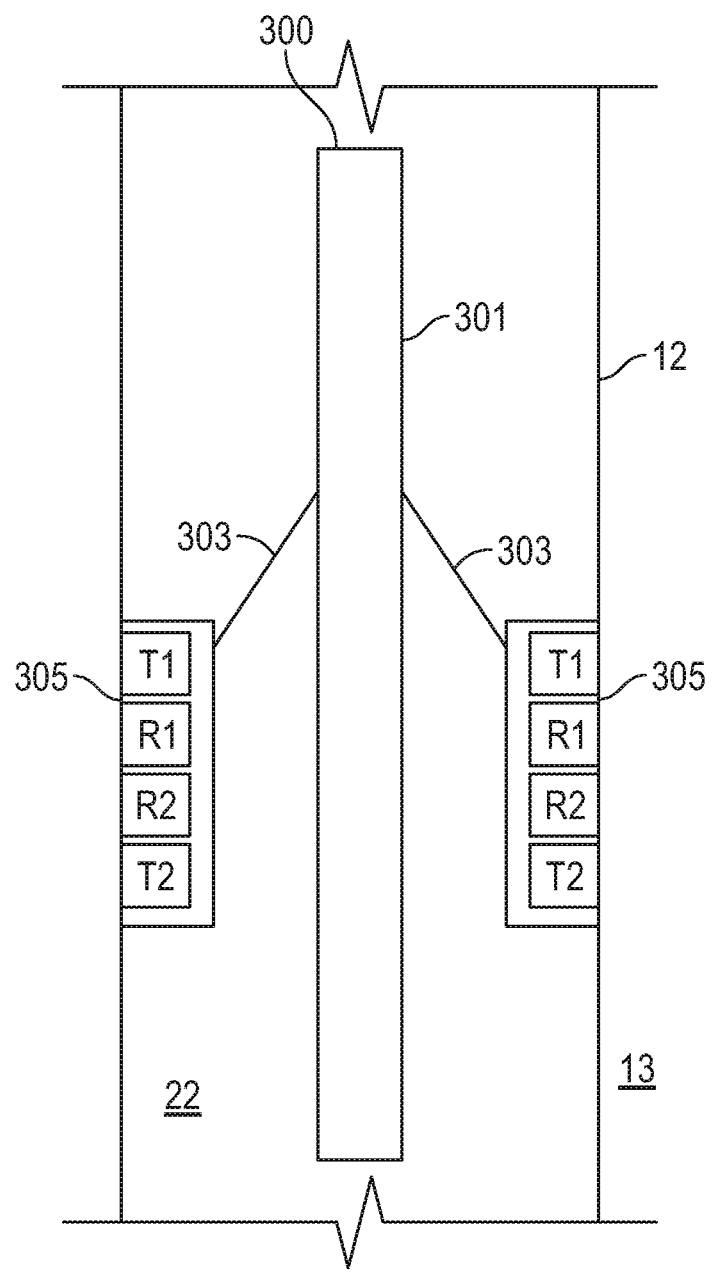
FIG. 3A shows downhole logging tool for evaluating an earth formation according to embodiments of the present disclosure.

FIG. 3A shows downhole logging tool (downhole tool, logging tool, multi-frequency dielectric array logging tool, electromagnetic tool, dielectric tool, or tool) 300 for evaluating an earth formation according to embodiments of the present disclosure. The dielectric tool 300 may be disposed on carrier 11 (not shown) intersecting the earth formation 13. The dielectric tool 300 may include a body (e.g., BHA, housing, enclosure, drill string, wireline tool body) 301 having pads 305 extended on extension devices 303. Two pads are shown for illustrative purposes and, in actual practice, there may be more or fewer pads, such as three pads separated by about 120 degrees circumferentially or six pads separated by about 60 degrees. The extension devices 305 may be electrically operated, electromechanically operated, mechanically operated or hydraulically operated. With the extension devices 303 fully extended, the pads (dielectric tool pads) 305 may engage the borehole 12 and make measurements indicative of at least one parameter of interest of the volume under investigation, such as water saturation, water conductivity, water permittivity, permittivity of dry rock, permittivity of hydrocarbons, textural parameters of the formation (e.g., grain shape), cation exchange capacity ('CEC'), and total porosity.

Pads 305 may include a face configured to engage the borehole 12. The term "engage," as used herein, may be defined as in contact with the borehole 12, urged against the borehole 12, pressed firmly against the borehole 12, or positioned proximate the borehole 12. The term "proximate," as used herein, may be defined as the pad being near the borehole 12 such that measurements may be taken from the pad that are useful in evaluating the borehole, earth formation, or both. The term "face" refers to the surface, edge, or side of the tool body or pad that is closest to the borehole wall.

Pads 305 may include transmitter T1, T2 and receivers R1, R2. The transmitters may be configured to radiate EM waves into the formation; and the receivers may be configured to be responsive to the EM waves radiating in the formation and generate a signal that is indicative of the parameter of interest. A processor may be configured to estimate the amplitude attenuation and phase difference between the transmitted signal and the received signals, which are used to estimate the parameter of interest. As an example, the attenuation and phase difference may be estimated between the received signals from at least two spaced receivers. This processing may be done downhole or at the surface, by using one or more processors hardware environment 29.

Figure 3B:
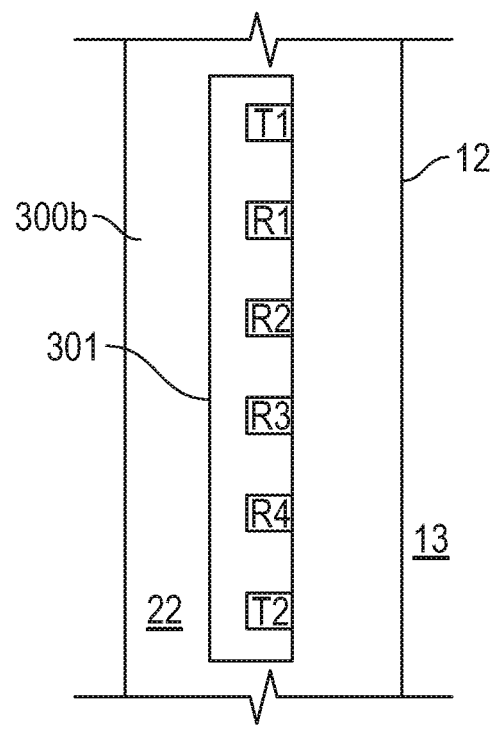
FIG. 3B shows a cross-sectional view of multi-frequency dielectric logging tool in accordance with embodiments of the present disclosure.

FIG. 3B shows a cross-sectional view of multi-frequency dielectric logging tool 300b in accordance with embodiments of the present disclosure. Dielectric tool 300b may include tool body 301 having transmitters T1, T2 and receivers R1-R4 disposed on tool body 301. In other embodiments, the transmitter-receiver configuration of logging tool 300b may be included on pads 305.

Figure 3C:
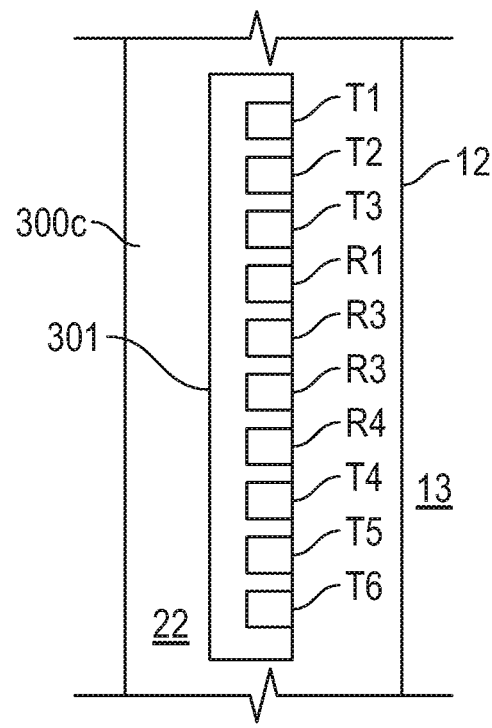
FIG. 3C shows a cross-sectional view of multi-frequency dielectric logging tool in accordance with embodiments of the present disclosure.

FIG. 3C shows a cross-sectional view of multi-frequency dielectric logging tool in accordance with embodiments of the present disclosure. Dielectric tool 300c may include tool body 301 having transmitters T1-T6 and receivers R1-R4 disposed on tool body 301. In other embodiments, the transmitter-receiver configuration of logging tool 300c may be included on pads 305.

Referring to FIGS. 3A-3C, the transmitters may be positioned symmetrically on pads 305 or tool body 301 with respect to the receivers on dielectric tools 300, 300b, and 300c. For example, on dielectric tool 300b, the distance from T1 to R3 may be the same distance as from T2 to R2; and the distance from T1 to R1 may be the same distance as from T2 to R4. In addition, each receiver may have a spacing from its adjacent receiver such that an EM wave propagating between those receivers travels at most one half wavelength (i.e., the propagation of EM waves between each adjacent receiver has a phase shift that is no greater than $\pi$ radians or 180° due to the formation and not taking into account internal phase shifts of the tool circuitry). Also, the spacing between R1 and R2 may not exceed one half wavelength of the EM wave propagating in formation 13. The spacing between adjacent receivers may depend on the frequency range of the dielectric tool.

As non-limiting examples, each transmitter or receiver of the multi-frequency dielectric array logging tool may be configured as a loop antenna, a coil antenna, a monopole antenna, a dipole antenna, an antenna array, a patch antenna, a reflector antenna, a log-periodic antenna, etc. Each transmitter or receiver may be configured to operate at a plurality of frequencies.

The tool may use only a few frequencies. As an example, each transmitter or receiver may be configured to operate at a frequency range from about 35 MHz to about 1 GHz and tuned to only these discrete frequencies 35 MHz, 84 MHz, 200 MHz, 450 MHz, and 1000 MHz. Thus, each transmitter or receiver may be configured to have a bandwidth of about 1 GHz and tuned to a plurality of frequencies within that frequency band, and each tuned frequency within that band may be separated by at least 50 MHz.

Using complex measurements of the effective dielectric at multiple frequencies, the equations of the mixing model may be fit to the dispersion curve to obtain values for parameters of interest. In some embodiments, a mixing model may have a large number of unknown parameters, and thus more equations (and hence more measurements at more frequencies) may be utilized. Using the determined parameters for the selected mixing model and a given value of total porosity (obtained, for example, from previous measurements), the system of equations may be solved for parameter values. In cases where a solution is overdetermined, a least squares fitting algorithm may be used to estimate the parameters.

Techniques of the Present Disclosure

General embodiments of the present disclosure include methods for evaluating a volume of an earth formation wherein the volume comprises a rock matrix saturated by a fluid including water. Methods may include making measurements of complex permittivity at a plurality of frequencies using an electromagnetic tool, comprising at least one transmitter and at least one receiver in a borehole penetrating the earth formation, to transmit signals into the volume at a plurality of frequencies. The complex dielectric measurements may be modeled using a mixing model approximating the dielectric behavior of the volume responsive to properties of the volume (e.g., parameters of interest). As dielectric dispersive behavior of the volume is sensitive to these parameters, measuring the dielectric behavior of the formation at multiple frequencies provides a means to quantify these parameters.

Aspects of the disclosure enable identification of the most accurate salinity and water saturation in real-time using downhole dielectric measurements. Inversion techniques consistent with those disclosed herein may be characterized as data oriented and self-dependent, thereby eliminating potential errors caused by insufficient input information and reducing dependence of dielectric tools on other logging measurements.

Methods of the present disclosure may include identifying an optimal frequency. Identifying the optimal frequency may be carried out by identifying candidate frequencies of the plurality of frequencies having a corresponding measurement with a respective sensitivity to at least one of i) salinity and ii) water-filled porosity, by determining that each respective sensitivity is substantially independent of rock texture; and selecting a maximum of the candidate frequencies as the optimal frequency.

Methods may include using a table search method based on a forward model to generate an initial estimate of at least two parameters of the volume (e.g., water salinity and water filled porosity); and using the initial estimate for the at least two parameters as an initial condition for an inversion of other measurements of the plurality of measurements at a frequency other than the optimal frequency to generate a final solution comprising final estimates for properties of the formation.

In general embodiments, models in accordance with embodiments of the present disclosure may be expressed using the equation $$^{CEXP}\sqrt{\varepsilon^*_{Formation}} = (1-\Phi)^{CEXP}\sqrt{\varepsilon_{Matrix}} + S_W \Phi^{CEXP}\sqrt{\varepsilon^*_{Water}} + (1-S_W)^{CEXP}\sqrt{\varepsilon_{Oil}}, \quad (29)$$

where $C_{EXP}$ is a general exponent. That is, $C_{EXP}$ is the degree of the root of each component's (phase's) permittivity, and may be a positive rational number.

Complex water permittivity is the dominant cause of formation dispersion. Effects of water come in two parts: first, the high dielectric constant of water increases permittivity of the entire mixture; in contrast, water salinity introduces a lossy term which has an impact on dielectric frequency spectrum. In general, larger water content leads to higher relative formation permittivity, and more conductive water denotes a steeper dispersive spectrum.

Considering a volume of porous rock saturated by water and oil, the bulk permittivity of the volume is determined by water salinity, fluids and matrix volume, and rock textures. Salinity contributes to both conductivity and permittivity. At the same time, it affects dispersion of permittivity and conductivity.

$$\varepsilon^*_w = \varepsilon'_{\omega r} = j\varepsilon''_{\omega r} - j\frac{\sigma(\omega)}{\omega \varepsilon_0} \quad (x)$$

$$[R\varepsilon_r] = \text{Model}(C\omega, \varphi\omega, EXP) \quad (x)$$

where R is resistivity, $\varepsilon_r$ is permittivity, $C\omega$ is salinity, $\varphi\omega$ is water-filled porosity, and EXP is a textural parameter.

Figure 4A:
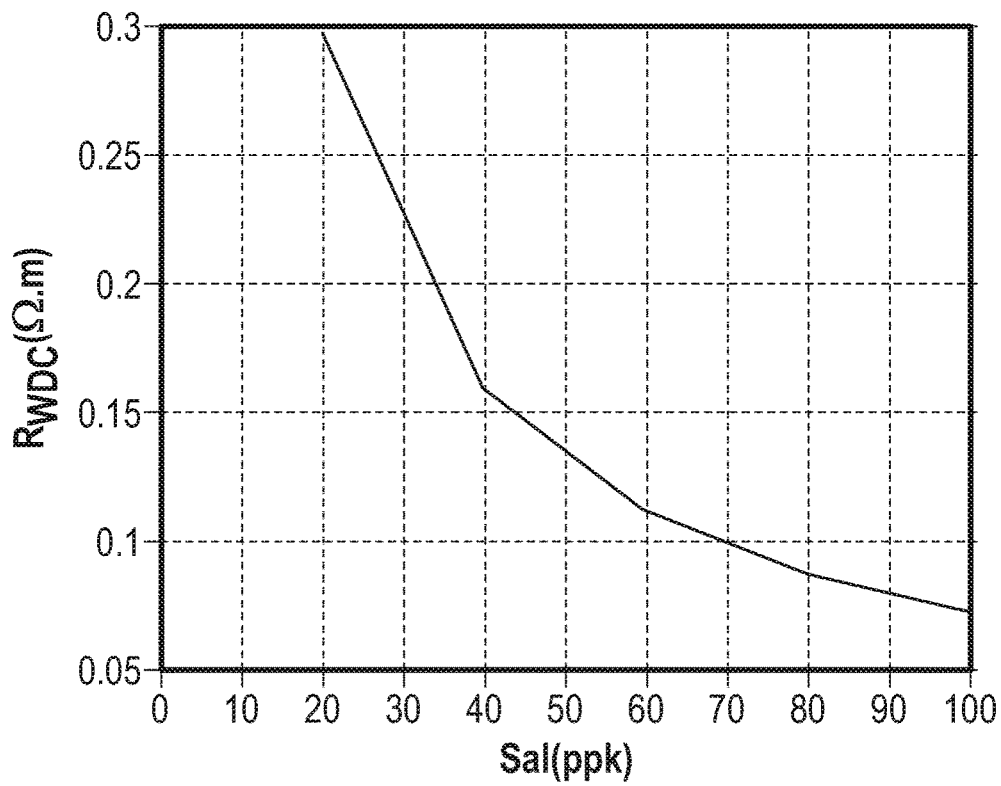
FIGS. 4A & 4B illustrate the effect of salinity of water of the volume on bulk dielectric measurements of the volume of the formation.
Figure 4B:
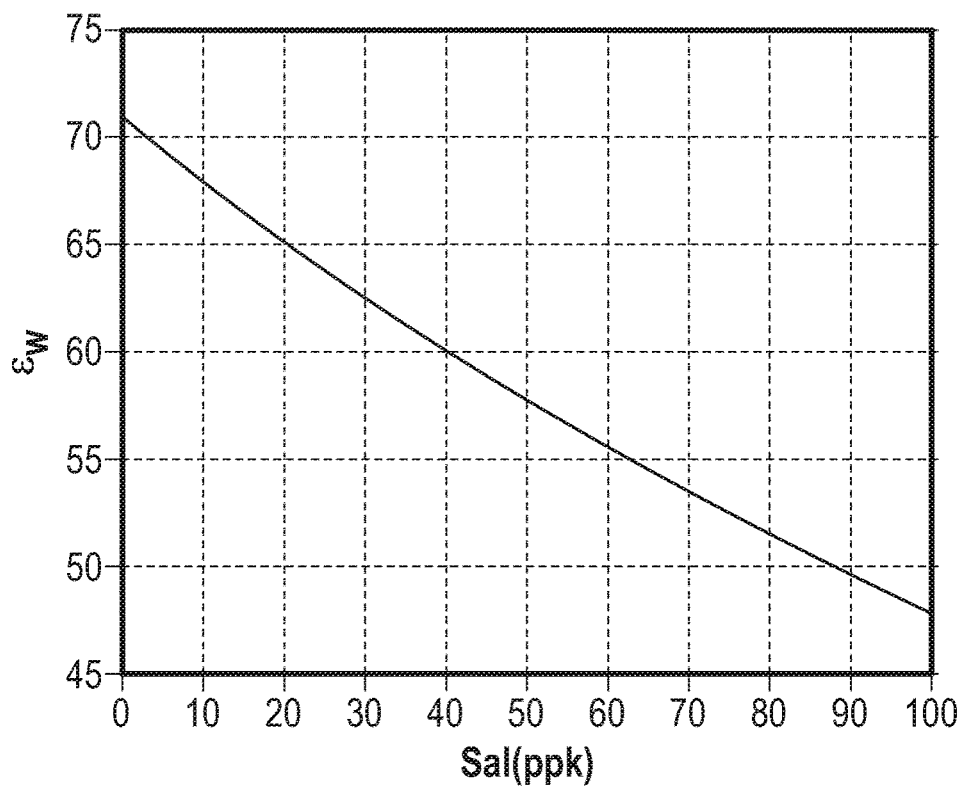

FIGS. 4A & 4B illustrate the effect of salinity of water of the volume on bulk dielectric measurements of the volume of the formation. FIG. 4A illustrates the effect of salinity of water of the volume on resistivity. FIG. 4B illustrates the effect of salinity of water of the volume on permittivity. Increasing salinity in water will cause it's conductivity to increase. Another effect free moving ions have is to restrain the polarization capability of water molecules, thus reducing permittivity of water. FIGS. 4A & 4B show the permittivity and conductivity varying curves with respect to salinity and clearly display this behavior.

Figure 5A:
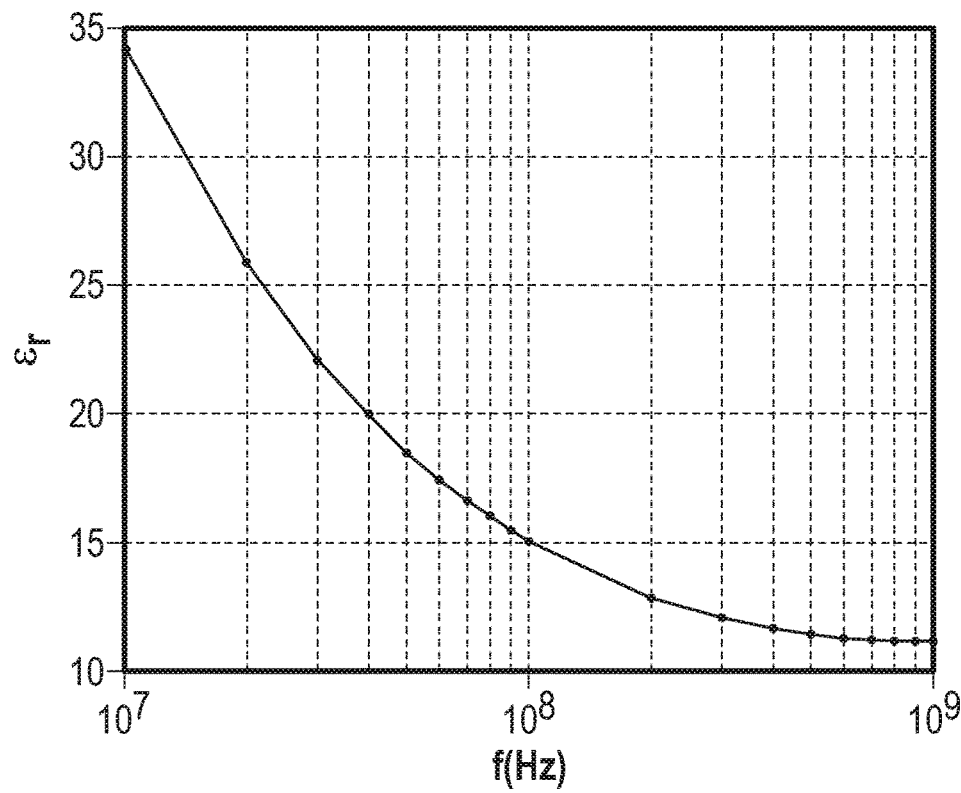
FIGS. 5A & 5B illustrate the effect of measurement frequency on bulk dielectric measurements of the volume of the formation.
Figure 5B:
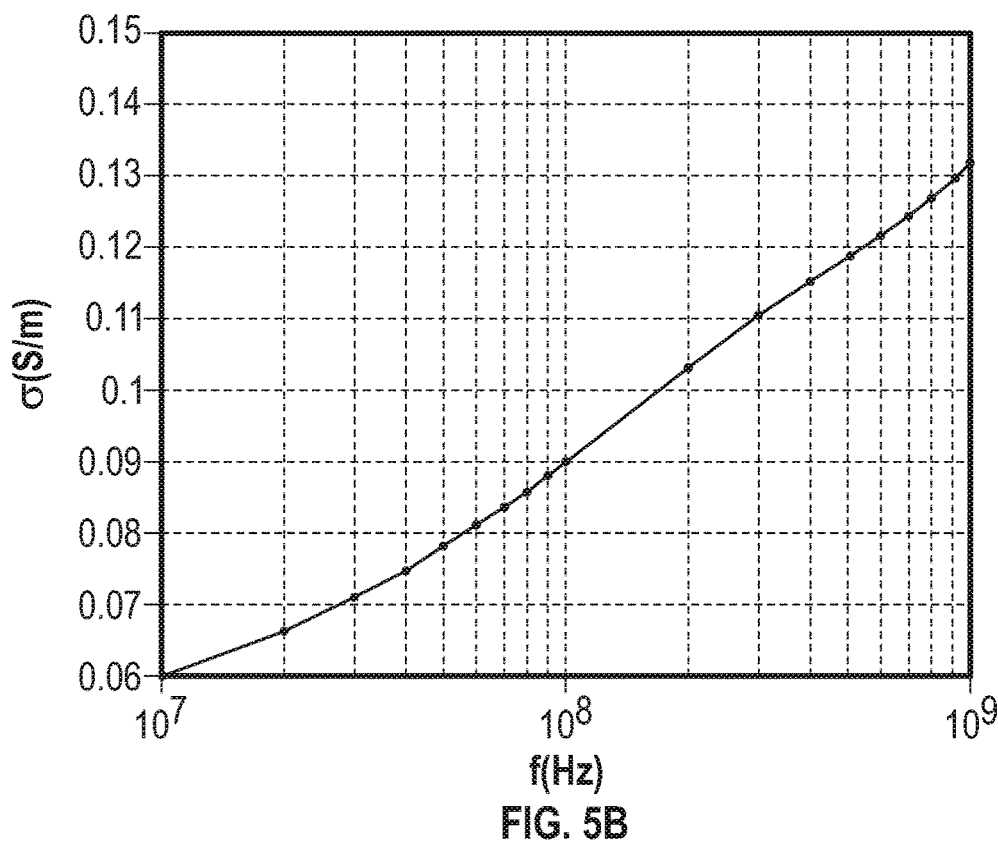

FIGS. 5A & 5B illustrate the effect of measurement frequency on bulk dielectric measurements of the volume of the formation. FIG. 5A illustrates the effect of frequency on conductivity. FIG. 5B illustrates the effect of frequency on permittivity. The figures show a decrease in permittivity and increase in conductivity as frequency increases.

Figure 6A:
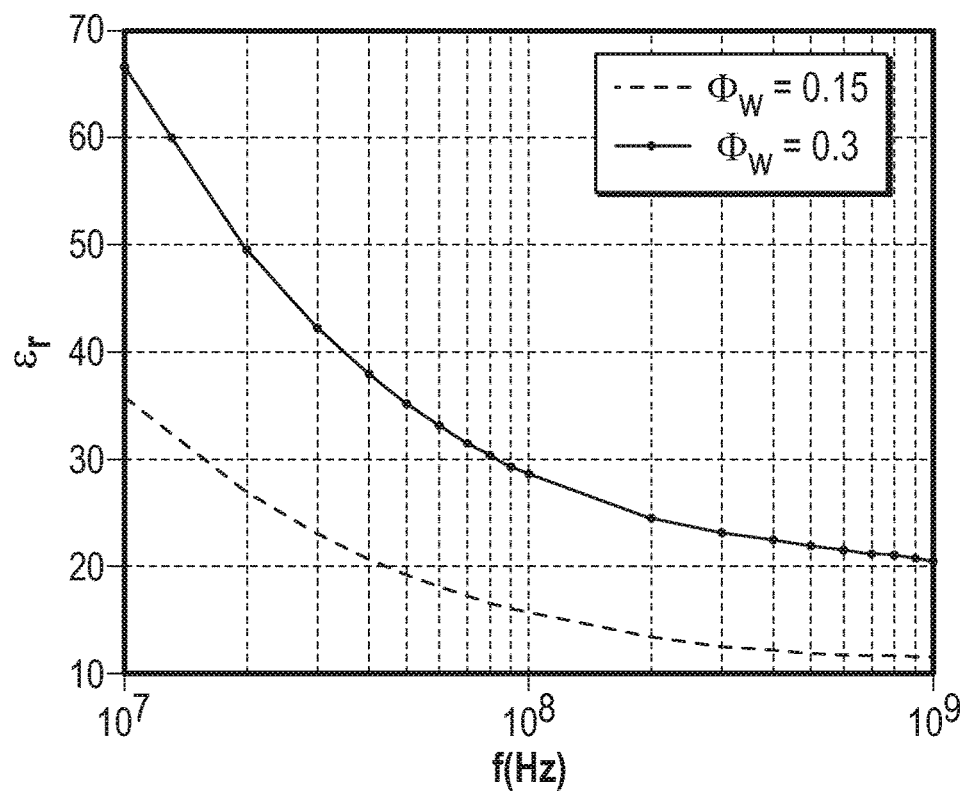
FIGS. 6A & 6B illustrate the effect of water content with respect to measurement frequency on bulk dielectric measurements of the volume of the formation.
Figure 6B:
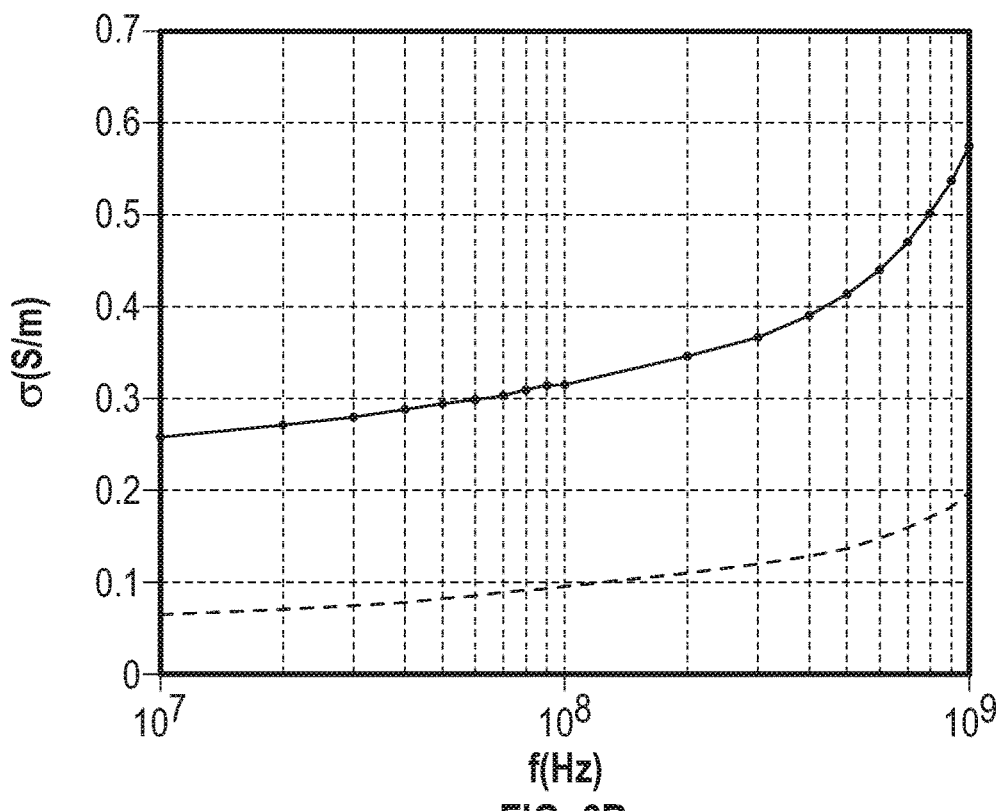

FIGS. 6A & 6B illustrate the effect of water content with respect to measurement frequency on bulk dielectric measurements of the volume of the formation. FIG. 6A illustrates the effect of water content with respect to frequency on conductivity. FIG. 6B illustrates the effect of water content with respect to frequency on permittivity. The figures show a higher permittivity with existence of higher water content in the bulk.

Figure 7A:
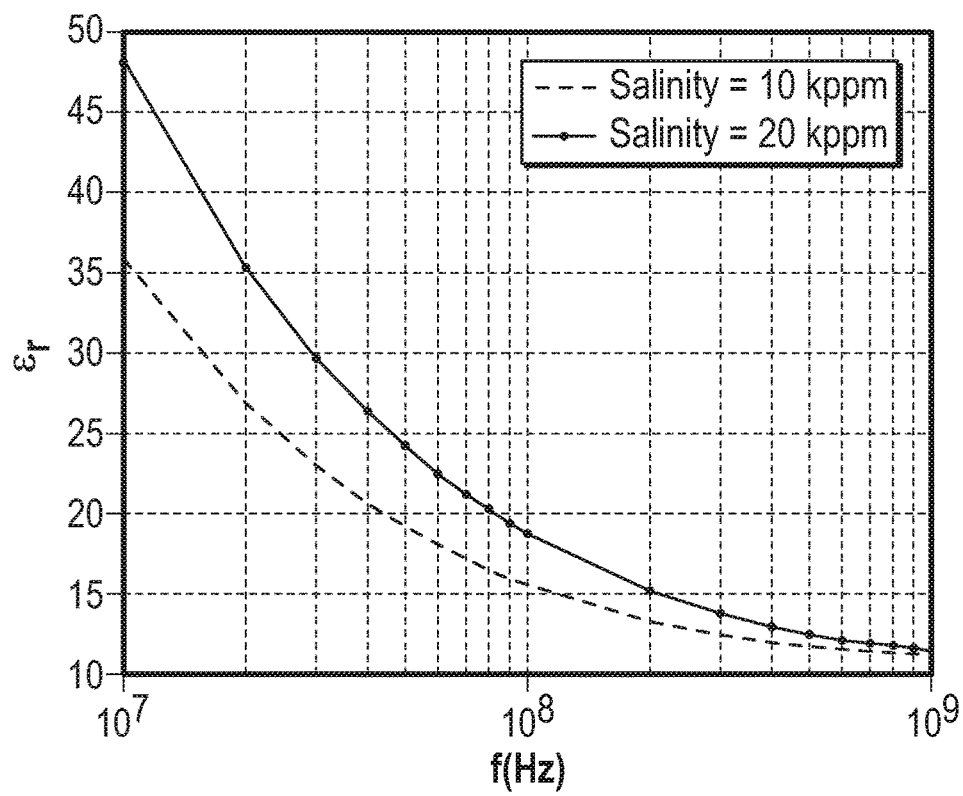
FIGS. 7A & 7B illustrate the effect of salinity with respect to measurement frequency on bulk dielectric measurements of the volume of the formation.
Figure 7B:
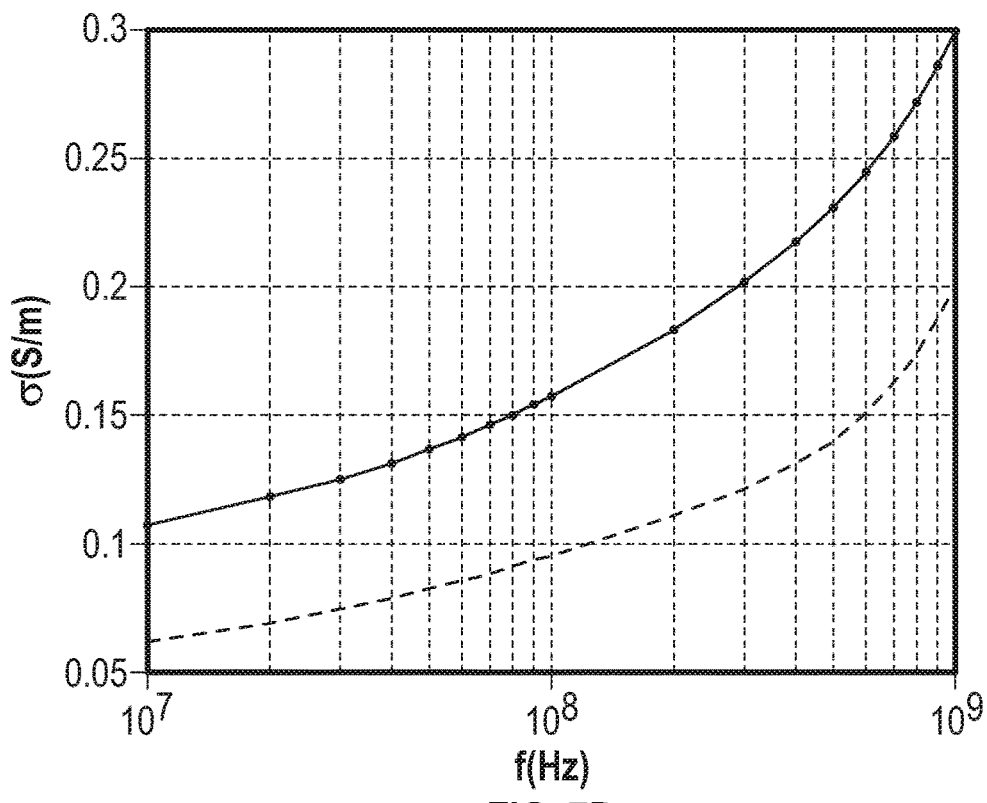

FIGS. 7A & 7B illustrate the effect of salinity with respect to measurement frequency on bulk dielectric measurements of the volume of the formation. FIG. 7A illustrates the effect of salinity with respect to frequency on conductivity. FIG. 7B illustrates the effect of salinity with respect to frequency on permittivity. It is apparent from the figures that low-frequency dielectric enhancement is more pronounced with higher salinity.

Figure 8:
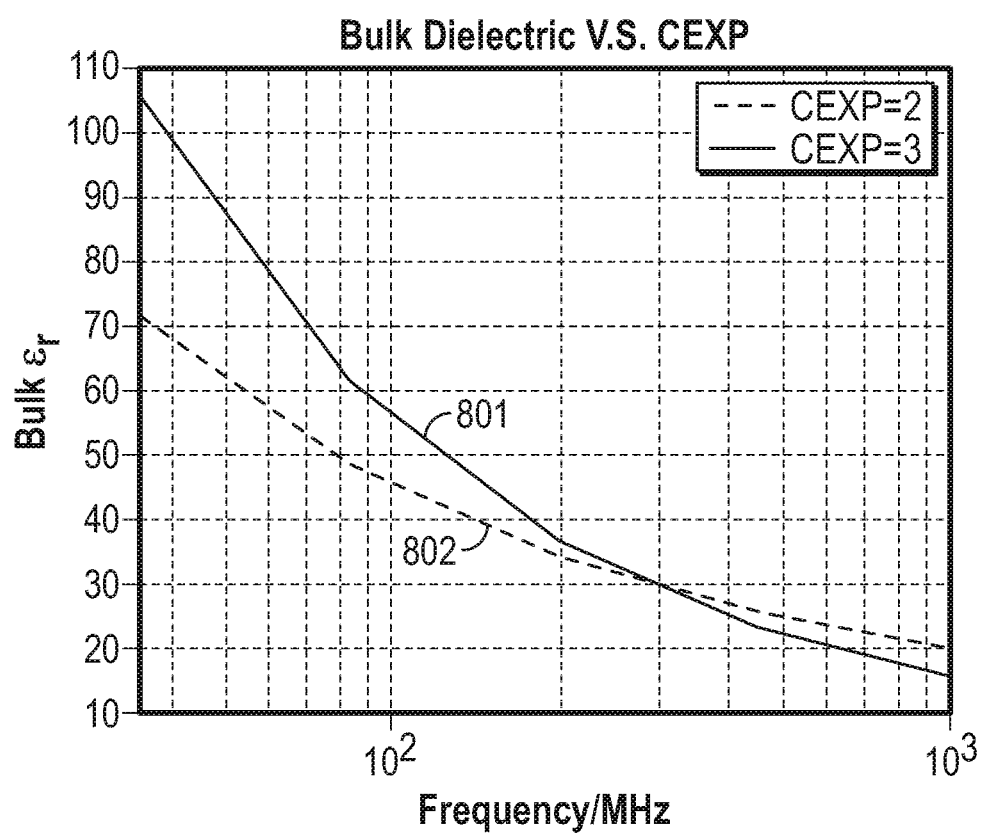
FIG. 8 illustrates the effect of a textural parameter with respect to measurement frequency on bulk dielectric measurements of the volume of the formation.

FIG. 8 illustrates the effect of a textural parameter with respect to measurement frequency on bulk dielectric measurements of the volume of the formation. It is apparent from the figures that low-frequency dielectric enhancement is more pronounced with higher salinity.

Solution uniqueness of bulk permittivity and conductivity with respect to salinity and water content is best at high frequencies. Based on the model, we can observe that sensitivity of downhole dielectric measurements to $C\omega$ and $\varphi\omega$ is different at different frequencies. At higher frequencies, salinity and volumetric effects dominate. At lower frequencies, on the contrary, rock texture effects dominate.

Without a good reference model, accurate inversion for salinity and water filled porosity from low-frequency measurements is problematic. Even if all the frequencies are combined, ambiguity at lower frequencies deteriorates inversion and sabotages stability when initial guesses are too far from true results.

Aspects of the disclosure include novel inversion techniques with a data-based automatic initial guess search described in further detail below. These techniques are forward-model independent; that is, the inversion may incorporate any forward model meeting the requirements described above. Some general embodiments relate to detecting the highest frequency where measurement sensitivity to salinity and water filled porosity is significant, and searching through charts with various textural parameters to find the best inversion solution of the highest frequency. Different measurement spacings may be combined. This highest frequency solution may in turn be used as an initial guess and as a reference model as well. The process may include iteratively adjusting weights on inversion models based on highest frequency solution uncertainties.

Figure 9:
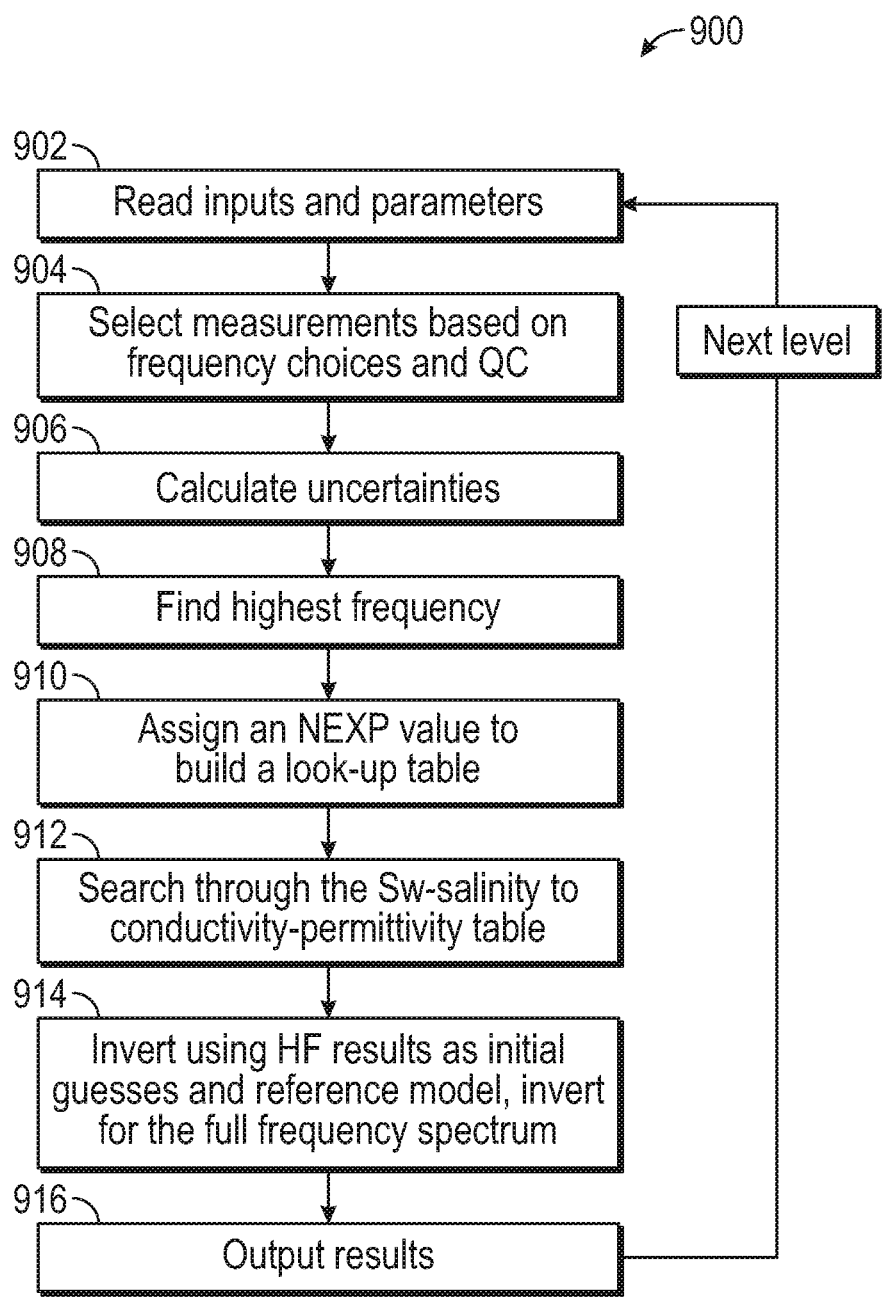
FIG. 9 is shows a data flow diagram illustrating a workflow in accordance with embodiments of the present disclosure.

FIG. 9 is shows a data flow diagram illustrating a workflow in accordance with embodiments of the present disclosure. Step 902 comprises reading the selected inputs and parameters. Permittivity and conductivity measurements from downhole tool measurements are major inputs to the inversion. Meanwhile, a few auxiliary measurements including temperature, porosity, induction or galvanic resistivity may also be read. All parameters required for the inversion are fed to the program at this step.

Step 904 comprises selecting measurements based on frequency criteria and data quality control ('QC'). Frequency criteria are discussed in further detail below. Data quality control must be done before performing an inversion. Example criteria may include the near receiver signal amplitude of a given spacing, consistency of permittivity and conductivity frequency spectrum, and indication of abnormal borehole conditions such as washouts.

Step 906 comprises calculating uncertainties. Uncertainties in permittivity and conductivity are propagated from noise in raw measurements (e.g., attenuation and phase differences between two receivers in an antenna array set). It may be prudent to determine uncertainties before conducting an inversion.

Step 908 comprises finding a frequency to use for initial guess computation. As explained in greater detail above, high frequency permittivity and conductivity measurements are generally affected by volumetric fraction of rock mixtures and salinity of connate water and are almost independent of rock texture; thus, these measurements can denote a unique solution for water saturation and salinity. The single high-frequency solution may be used as an initial guess to solve the entire frequency spectrum to stabilize the inversion and avoid ambiguity. Meanwhile, the single frequency solution is susceptible to uncertainties of the corresponding measurements. In one example, based on the uncertainties of each permittivity and conductivity pair among the highest three working frequencies, the most reliable frequency may be chosen to compute initial guesses.

Step 910 comprises assigning an NEXP value to build a look-up table. That is, a map is built with a given NEXP value. From the steps described above, the user may have defined permittivity and conductivity from a specific spacing at a typical high frequency. The permittivity and conductivity curves may be used to find an initial solution of water saturation and salinity. Then the program may invert a final solution which fits all the measurements by starting the iteration from the initial solution.

Figure 10:
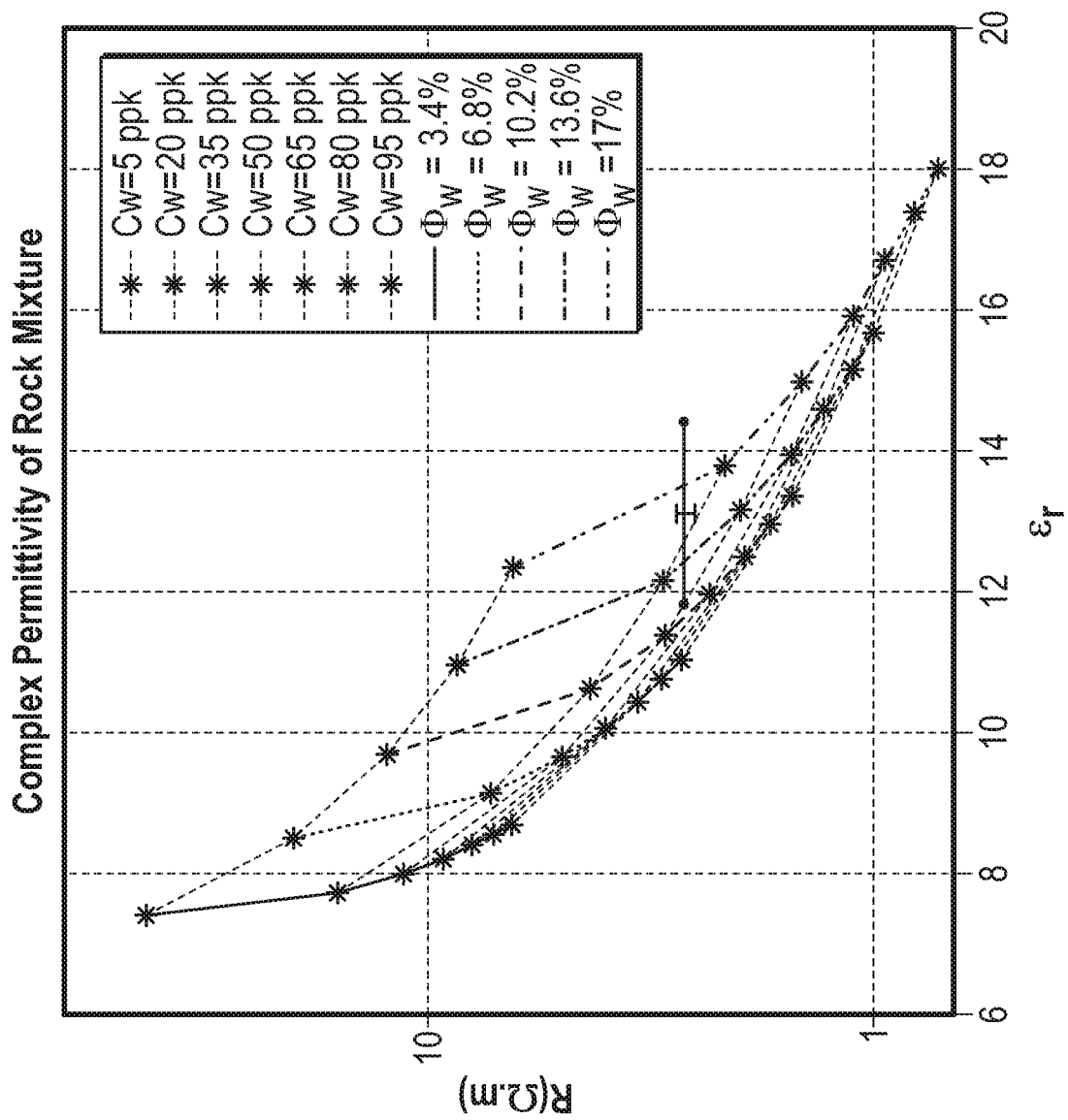
FIG. 10 illustrates a mapping of complex permittivity to resistivity.

A map search approach may be used to compute the initial solution. First, a look-up-map may be built, where, for example, the salinity range is 0 to 200 kppm and the water saturation range is 0 to 100%. FIG. 10 illustrates a mapping of complex permittivity to resistivity at various values of $C\omega$ and $\varphi\omega$. In addition, other parameters of the model may also vary. These other parameters may include an exponent value from user input, matrix permittivity, and porosity values of current level. The map may consist of fine grids representing salinity and water saturation value sequences. Each combination of water saturation and salinity would give a set of a permittivity and conductivity responses (see FIG. 10).

Step 912 comprises searching through the water saturation-salinity to conductivity-permittivity table. With the selected tool measurements, by searching the map the solution of water saturation and salinity can be found as a grid point which has the shortest distance from measurement. If the measurement is out of the search map, its projection on the closest map boundary may be taken as the initial solution.

Step 914 comprises performing an inversion with the high-frequency results. The results may be used as the initial solution and reference model. At block 916, the steps may be repeated using the output results. As initial guesses computed from high frequency are obtained, an inversion may be conducted by iterating through a minimization routine until converging to a solution which fits all frequency measurements. The reference model used in inversion may also be updated to be the same as the initial guesses computed.

Figure 11:
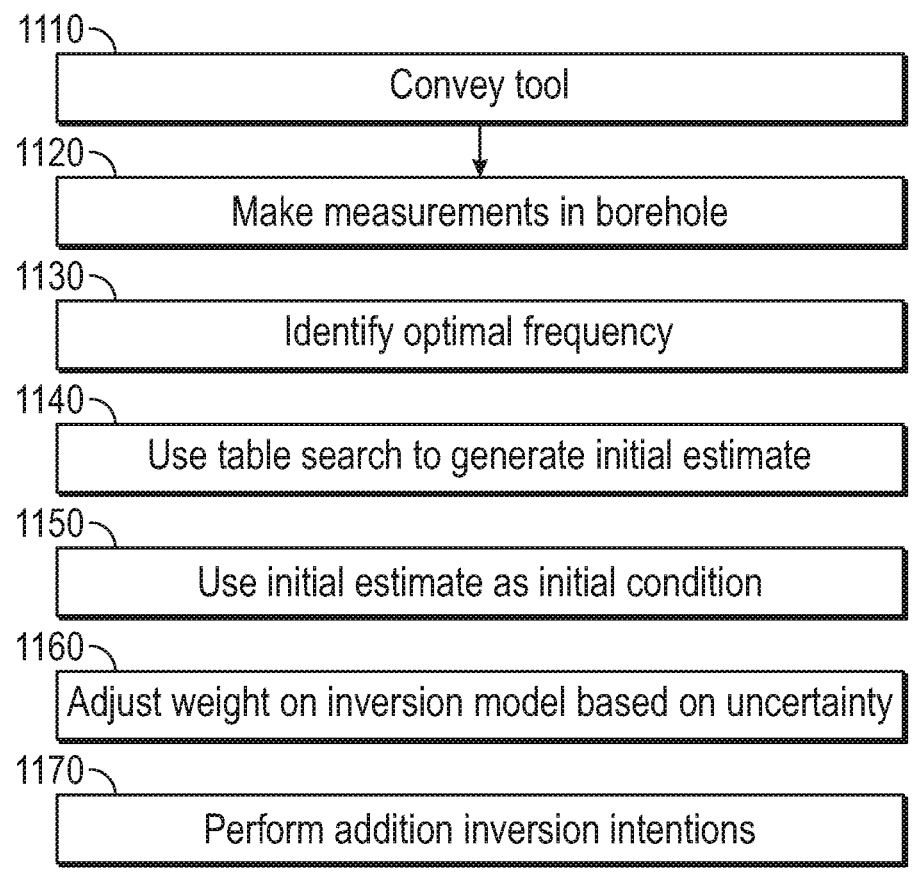
FIG. 11 illustrates a method for evaluating an earth formation using complex dielectric measurements.

FIG. 11 illustrates a method for evaluating an earth formation using complex dielectric measurements. The complex dielectric measurements may be modeled using a selected mixing model approximating the dielectric behavior of the formation, as described above. At optional step 1110, the method may include conveying an electromagnetic tool in a borehole proximate a volume of interest of an earth formation. Conveying the tool may include tripping the tool on a wireline, conveying the tool on a drillstring by rotating a drillbit on a bottom hole assembly (BHA) at the distal end of the drill string to extend the borehole, and so on. At optional step 1120, the method may include making complex dielectric measurements of the volume of interest in the borehole. Step 1120 may be carried out by exciting one or more transmitters in the borehole at a plurality of frequencies to transmit signals into the volume, receiving signals at a plurality of receivers responsive to the excitation, and processing the signals to generate measurements. Steps 1110 and 1120 may be carried out by using at least one processor to direct the carrier or other drilling or borehole equipment, or control the transmitters, either directly, or by using commands to intermediate processors (e.g., controllers, DSPs, and the like) in operative connection with measurement circuitry including signal generators, amplifiers, power sources, data storage, etc. to generate and measure electromagnetic phenomena (e.g., a propagating wave). Making measurements may include estimating a phase shift associated with one or more signals.

Step 1130 comprises identifying an optimal frequency, and may be carried out by identifying candidate frequencies of the plurality of frequencies having a corresponding measurement with a respective sensitivity to at least one of i) salinity and ii) water-filled porosity, and selecting a maximum of the candidate frequencies as the optimal frequency. Identifying the candidate frequencies may be carried out by determining that each respective sensitivity is substantially independent of rock texture. Alternatively or additionally, identifying candidate frequencies may be carried out based on an uncertainty value associated with at least one of: i) a set of respective values for conductivity and permittivity of each candidate frequency, and ii) amplitude values of receiver sensor signal of the electromagnetic tool.

Step 1140 comprises using a table search method based on a forward model to generate an initial estimate of at least two parameters of the volume. Step 1150 comprises using the initial estimate for the at least two parameters as an initial condition for an inversion of other measurements of the plurality of measurements at a frequency other than the optimal frequency to generate a final solution comprising final estimates for properties of the formation. The table search method may include a correlation of the initial estimate of the at least two parameters with a combination of a particular conductivity value and a particular permittivity value at the optimal frequency at a particular spacing for the transmitter and the receiver.

Optional step 1150 comprises using the initial estimate of the at least two parameters to generate a model for performing an inversion which uses the plurality of propagation measurements as input and generates at least one petrophysical parameter as output. The model may comprise a petrophysical mixing model.

Optional step 1160 comprises adjusting a weight on an inversion model based on an uncertainty for the initial estimate of the at least two parameters and uncertainty for the plurality of propagation measurements. Optional step 1170 comprises performing additional inversion iterations using a minimization routine to converge to the final solution for the plurality of frequencies. Optional step 1180 may include using the values resulting from the inversion to estimate other parameters of interest of the volume or the formation, including formation properties, such as, for example, clay type.

Other, optional, steps may include evaluating the formation or modeling the formation using the parameters of interest, conducting secondary recovery operations in dependence upon the estimated parameters, the model, a location of a boundary, or combinations of these. Secondary recovery operations may include any or all of drilling operations, injection operations, production operations, and the like. For example, the method may include commencing, modifying, continuing, or halting one or more drilling or production operations in dependence upon a model of the formation characterizing particular volumes of interest as having particular properties (e.g., values of one or more parameters of interest). Example embodiments may include using the at least one processor to perform at least one of: i) storing the at least one parameter of interest in a computer memory; ii) transmitting the at least one parameter of interest uphole; or iii) displaying of the parameter of interest to an operating engineer.

Mathematical models, look-up tables, neural networks, or other models representing relationships between the signals and the values of the formation properties may be used to characterize the drilling operation, optimize one or more drilling parameters of a drilling operation, change direction of drilling, or otherwise modify drilling operations in the borehole. The system may carry out these actions through notifications, advice, and/or intelligent control.

The term "conveyance device" or "carrier" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, and self-propelled tractors. "Tubular," as used herein, means one or more segments of tubular, including, for example, drill pipe, drill collar, mandrel and so on.

Processing of data may include use of a computer program implemented on a suitable non-transitory machine-readable medium (non-transitory computer-readable medium) that enables the processor to perform the control and processing. The non-transitory machine-readable medium may include ROMs, EPROMs, EAROMs, Flash Memories, Optical disks, and Hard disks. As noted above, the processing may be done downhole or at the surface, by using one or more processors. In addition, results of the processing, such as an image of permittivity or parameter values, can be stored on a suitable medium.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, a processor includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Thus, configuration of the processor may include operative connection with resident memory and peripherals for executing programmed instructions. In some embodiments, estimation of the parameter of interest may involve applying a model. The model may include, but is not limited to, (i) a mathematical equation, (ii) an algorithm, (iii) a database of associated parameters, or a combination thereof. Herein, the term "information" may include one or more of: raw data, processed data, and signals.

The term "pad," as used herein, refers to that part of a logging tool that is pressed firmly against the borehole wall and holds sensors (e.g. an antenna assembly according to embodiments of this disclosure) to measure the parameter of interest of the earth formation. The pad may be extended from the tool body on an arm or may be incorporated into the tool body.

As described herein, "complex permittivity" refers to a permittivity having a real part, which is commonly called the dielectric constant, and an imaginary part, which is commonly called the dielectric loss factor or loss tangent.

The term "mixing model" refers a quantitatively expressed relation between the dielectric behavior of a mixture and the properties of its constituents. More specifically, in the context of the present disclosure, these constituents refer to the rock matrix of the formation and the water and hydrocarbon within. The relation may include details such as the volume fraction of each of these phases, their geometry and distribution within a representative volume of the formation, and electrical surface conductivity of particular particles.

Estimated parameters of interest may be stored (recorded) as information or visually depicted on a display. Aspects of the present disclosure relate to modeling a volume of an earth formation using the estimated parameter of interest, such as, for example, by associating estimated parameter values with portions of the volume of interest to which they correspond. The model of the earth formation generated and maintained in aspects of the disclosure may be implemented as a representation of the earth formation stored as information. The information (e.g., data) may be stored on a non-transitory machine-readable medium, and rendered (e.g., visually depicted) on a display.

Control of components of apparatus and systems described herein may be carried out using one or more models as described above. For example, at least one processor may be configured to modify operations i) autonomously upon triggering conditions, ii) in response to operator commands, or iii) combinations of these. Such modifications may include changing drilling parameters, steering the drillbit (e.g., geosteering), changing a mud program, optimizing measurements, and so on. Control of these devices, and of the various processes of the drilling system generally, may be carried out in a completely automated fashion or through interaction with personnel via notifications, graphical representations, user interfaces and the like. Reference information accessible to the processor may also be used.

While the present disclosure is discussed in the context of a hydrocarbon producing well, it should be understood that the present disclosure may be used in any borehole environment (e.g., a water or geothermal well).

The present disclosure is susceptible to embodiments of different forms. There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

What is claimed is:

1. A method of evaluating a volume of an earth formation wherein the volume comprises a rock matrix saturated by a fluid including water, the method comprising:
   making measurements of complex permittivity at a plurality of frequencies using an electromagnetic tool comprising a transmitter and a receiver in a borehole penetrating the earth formation;
   identifying an optimal frequency by:
      identifying candidate frequencies of the plurality of frequencies having a corresponding measurement with a respective sensitivity to at least one of i) salinity and ii) water-filled porosity, by determining that each respective sensitivity is substantially independent of rock texture;
      selecting a maximum of the candidate frequencies as the optimal frequency;
   using a table search method based on a forward model to generate an initial estimate of at least two parameters of the volume; and
   using the initial estimate for the at least two parameters as an initial condition for an inversion of other measurements of the plurality of measurements at a frequency other than the optimal frequency to generate a final solution comprising final estimates for properties of the formation.

2. The method of claim 1 wherein the at least two parameters comprise water salinity and water filled porosity.

3. The method of claim 1 further comprising identifying candidate frequencies based on an uncertainty value associated with at least one of: i) a set of respective values for conductivity and permittivity of each candidate frequency, and ii) amplitude values of receiver sensor signal of the electromagnetic tool.

4. The method of claim 1 wherein the table search method comprises a correlation of the initial estimate of the at least two parameters with a combination of a particular conductivity value and a particular permittivity value at the optimal frequency at a particular spacing for the transmitter and the receiver.

5. The method of claim 1 comprising using the initial estimate of the at least two parameters to generate a model for performing an inversion which uses the plurality of propagation measurements as input and generates at least one petrophysical parameter as output.

6. The method of claim 1 wherein the model comprises a petrophysical mixing model.

7. The method of claim 1 comprising adjusting a weight on an inversion model based on an uncertainty for the initial estimate of the at least two parameters and uncertainty for the plurality of propagation measurements.

8. The method of claim 1 further comprising performing additional inversion iterations using a minimization routine to converge to the final solution for the plurality of frequencies.

9. The method of claim 1, further comprising:
   using the final solution to estimate an effective permittivity and an effective conductivity of the volume.

10. The method of claim 1, further comprising conveying the electromagnetic tool in the borehole.

11. The method of claim 1, wherein the electromagnetic tool uses electrical induction.

12. An apparatus for evaluating a volume of an earth formation wherein the volume comprises a fluid-saturated rock matrix, the apparatus comprising:
   a carrier configured to be conveyed in a borehole penetrating the earth formation;
   an electromagnetic tool disposed on the carrier and configured to make measurements of complex permittivity of a volume of the earth formation proximate the tool at a plurality of frequencies; and
   at least one processor operatively connected to the tool and configured to:
      identify an optimal frequency by:
         identifying candidate frequencies of the plurality of frequencies having a corresponding measurement with a respective sensitivity to at least one of i) salinity and ii) water-filled porosity, by determining that each respective sensitivity is substantially independent of rock texture;
         selecting a maximum of the candidate frequencies as the optimal frequency;
      use a table search method based on a forward model to generate an initial estimate of at least two parameters of the volume; and
      use the initial estimate for the at least two parameters as an initial condition for an inversion of other measurements of the plurality of measurements at a frequency other than the optimal frequency to generate a final solution comprising final estimates for properties of the formation.

* * * * *